United States Patent
Lee et al.

(10) Patent No.: US 9,219,260 B2
(45) Date of Patent: Dec. 22, 2015

(54) MIDDLE OR LARGE-SIZED BATTERY PACK OF IMPROVED SAFETY

(75) Inventors: Jin Kyu Lee, Busan (KR); Hee Soo Yoon, Daejeon (KR); BumHyun Lee, Seoul (KR); Dal Mo Kang, Daejeon (KR); Jongmoon Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 866 days.

(21) Appl. No.: 13/000,560

(22) PCT Filed: Jun. 20, 2009

(86) PCT No.: PCT/KR2009/003316
§ 371 (c)(1),
(2), (4) Date: Apr. 26, 2011

(87) PCT Pub. No.: WO2009/157676
PCT Pub. Date: Dec. 30, 2009

(65) Prior Publication Data
US 2011/0189514 A1   Aug. 4, 2011

(30) Foreign Application Priority Data
Jun. 25, 2008   (KR) .......................... 10-2008-0060385

(51) Int. Cl.
*H01M 10/02*   (2006.01)
*H01M 10/52*   (2006.01)
(Continued)

(52) U.S. Cl.
CPC .............. *H01M 2/1077* (2013.01); *H01M 2/12* (2013.01); *H01M 2/1241* (2013.01); *H01M 2/0212* (2013.01); *H01M 2/0275* (2013.01); *H01M 10/0525* (2013.01)

(58) Field of Classification Search
USPC ........... 429/50–52, 53–56, 96–100, 149–160, 429/163–187, 61, 57, 66, 67; 29/623.1–623.5, 730–731; 221/282; 206/703
See application file for complete search history.

(56) References Cited

U.S. PATENT DOCUMENTS 6,159,631 A * 12/2000 Thompson et al. ............. 429/82
6,392,172 B1 * 5/2002 Azema ....................... 200/61.08
(Continued)

FOREIGN PATENT DOCUMENTS

CN     2727978 Y    9/2005
CN   101164179 A    4/2008
(Continued)

OTHER PUBLICATIONS

Machine Translation of Lee (KR 10-2006-0114549, Published Nov. 2006, pp. 1-19).*
(Continued)

*Primary Examiner* — Basia Ridley
*Assistant Examiner* — Caitlin Wilmot
(74) *Attorney, Agent, or Firm* — Birch, Stewart, Kolasch & Birch, LLP

(57) ABSTRACT

Disclosed herein is a middle or large-sized battery pack including a battery module assembly configured in a structure in which a plurality of battery modules, each of which comprises a plurality of battery cells or unit modules connected in series to each other while being mounted in a module case, is electrically connected to each other while being arranged in a lateral direction such that the battery modules are in contact with each other, a pair of side support members for covering sides of outermost battery modules of the battery module assembly, and at least one top connection member for connecting the side support members at a top of the battery module assembly, wherein at least one of the side support members has a region (weak portion) exhibiting low resistance to volume expansion, the weak portion being partially formed at the at least one of the side support members for inducing local deformation of the battery modules upon occurrence of swelling, thereby causing a short circuit.

16 Claims, 6 Drawing Sheets

(51) Int. Cl.
*H01M 2/02* (2006.01)
*H01M 2/12* (2006.01)
*H01M 2/10* (2006.01)
*H01M 10/0525* (2010.01)

(56) References Cited

U.S. PATENT DOCUMENTS

2006/0105229 A1* 5/2006 Mac et al. .................. 429/56
2006/0267545 A1 11/2006 Lee et al.
2007/0238018 A1* 10/2007 Lee et al. .................. 429/159
2008/0118824 A1 5/2008 Oguma et al.

FOREIGN PATENT DOCUMENTS

| | | |
|---|---|---|
| CN | 101188274 A | 5/2008 |
| KP | 10-2007-0100555 A | 10/2007 |
| KR | 2001-0067092 A | 7/2001 |
| KR | 10-0351784 B1 | 8/2002 |
| KR | 10-2006-0011664 A | 2/2006 |
| KR | 10-2006-0114549 A | 11/2006 |
| KR | 10-2008-0027504 A | 3/2008 |
| KR | 10-2008-0034625 A | 4/2008 |
| KR | 10-0892046 B1 | 4/2009 |
| WO | WO 2006/118386 A1 | 11/2006 |
| WO | WO 2008/035872 A1 | 3/2008 |
| WO | WO 2009/066880 A2 | 5/2009 |

OTHER PUBLICATIONS

Machine Translation of Yoon (KR 10-2008-0027504, Published Mar. 2008, pp. 1-32).*

International Search Report for PCT/KR2009/003316 mailed Jan. 18, 2010.

* cited by examiner

MIDDLE OR LARGE-SIZED BATTERY PACK OF IMPROVED SAFETY

TECHNICAL FIELD

The present invention relates to a middle or large-sized battery pack with improved safety, and, more particularly, to a middle or large-sized battery pack including a battery module assembly configured in a structure in which a plurality of battery modules, each of which comprises a plurality of battery cells or unit modules connected in series to each other while being mounted in a module case, is arranged in a lateral direction such that the battery modules are in contact with each other, a pair of side support members, and at least one top connection member, wherein at least one of the side support members has a region (weak portion) exhibiting low resistance to volume expansion, the weak portion being partially formed at the at least one of the side support members for inducing local deformation of the battery modules upon occurrence of swelling, thereby causing a short circuit.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and high discharge voltage, on which much research has been carried out and which is now commercialized and widely used.

A secondary battery has attracted considerable attention as an energy source for power-driven devices, such as electric bicycles (E-bike), electric vehicles (EV), or hybrid electric vehicles (HEV), as well as an energy source for mobile wireless electronic devices, such as mobile phones, digital cameras, personal digital assistants (PDA), portable multimedia players (PMP), and laptop computers.

A small-sized battery pack having a battery cell packed therein is used for small-sized devices, such as mobile phones and digital cameras. On the other hand, a middle or large-sized battery pack including two or more battery cells (hereinafter, occasionally referred to as a "multi-cell") connected in parallel and/or in series to each other is used for middle or large-sized devices, such as laptop computers and electric vehicles.

As previously described, a lithium secondary battery exhibits excellent electrical properties; however, the lithium secondary battery has low safety. For example, when abnormal operations, such as overcharge, overdischarge, exposure to high temperature, and electrical short circuits, of the lithium secondary battery occur, decomposition of active materials and an electrolyte, which are components of the battery, is caused, with the result that heat and gas are generated, and the high-temperature and high-pressure condition caused by the generation of the heat and the gas accelerates the above-mentioned decomposition. Eventually, a fire or explosion may occur.

For this reason, the lithium secondary battery is provided with a safety system, such as a protection circuit for interrupting electric current during overcharge, overdischarge, or overcurrent of the battery, a positive temperature coefficient (PTC) element whose resistance greatly increases so as to interrupt electric current when the temperature of the battery increases, and a safety vent for interrupting electric current or discharging gas when pressure increases due to the generation of the gas. In the case of a small-sized cylindrical secondary battery, for example, the PTC element and the safety vent are usually disposed at the top of an electrode assembly (a generating element) having a cathode/separator/anode structure, which is mounted in a cylindrical case. In the case of a prismatic or pouch-shaped small-sized secondary battery, on the other hand, the protection circuit module and the PTC element are usually mounted at the upper end of a prismatic case or a pouch-shaped case, in which the generating element is mounted in a sealed state.

The safety-related problem of the lithium secondary battery is even more serious for a middle or large-sized battery pack having a multi-cell structure. Since a plurality of battery cells are used in the multi-cell structure battery pack, the abnormal operation of some of the battery cells may cause the abnormal operation of the other battery cells, with the result that a fire or explosion may occur, which may lead to a large-scale accident. For this reason, the middle or large-sized battery pack is provided with a safety system, such as a fuse, a bimetal, and a battery management system (BMS), for protecting the battery cells from the overcharge, the overdischarge, and the overcurrent.

However, as the lithium secondary battery is continuously used, i.e., as the lithium secondary battery is repeatedly charged and discharged, the generating element and the electrically connecting members are gradually degraded. For example, the degradation of the generating element leads to the decomposition of the electrode material and the electrolyte, by which gas is generated. As a result, the battery cell (the cylindrical, prismatic, or pouch-shaped case) gradually swells. In the normal state of the lithium secondary battery, the safety system, i.e., the BMS, detects the overdischarge, the overcharge, and the overcurrent, and controls/protects the battery pack. In the abnormal state of the lithium secondary battery, however, when the BMS does not operate, a possibility of danger increases, and it is difficult to control the battery pack for securing the safety of the battery pack. The middle or large-sized battery pack is generally constructed in a structure in which a plurality of battery cells is fixedly mounted in a prefabricated case. As a result, the respective swelling battery cells are further pressurized in the restrictive case, and therefore, a possibility of a fire or explosion greatly increases under the abnormal operation condition of the battery pack.

In connection with this case, FIG. 1 is a circuit diagram typically illustrating a conventional middle or large-sized battery pack. Referring to FIG. 1, a conventional middle or large-sized battery pack 900 includes a battery module assembly 500 including a plurality of battery modules electrically connected to each other, each of the battery modules including a plurality of battery cells or unit modules connected in series to each other while being mounted in a module case, a BMS 600 for detecting information on the operation status of the battery module assembly 500 and controlling the battery module assembly 500 based on the detected information, and a power switch unit (relay) 700 for performing connection or disconnection between the battery module assembly 500 and an external input and output circuit (inverter) 800 according to an operation command from the BMS 600.

The BMS 600 keeps the power switch unit 700 on during normal operation of the battery module assembly 500 and turns the power switch unit 700 off, when it is detected that the operation of the battery module assembly 500 is abnormal, to stop charge and discharge operations of the battery module assembly 500. During malfunction or non-operation of the BMS 600, on the other hand, the BMS 600 performs no control, and therefore, the power switch unit 700 is kept on. As a result, charge and discharge operations of the battery module assembly 500 are continuously performed even during abnormal operation of the battery module assembly 500.

Therefore, there is a high necessity for technology that is capable of fundamentally securing safety of a middle or large-sized battery pack while solving the above problems.

DISCLOSURE

Technical Problem

The present invention has been made to solve the above problems, and other technical problems that have yet to be resolved.

As a result of a variety of extensive and intensive studies and experiments to solve the problems as described above, the inventors of the present invention have found that, in case of a battery pack configured a structure in which a region having low resistance to volume expansion of the battery pack is partially formed at least on side support member of the battery pack, an expansion stress caused by the swelling of battery cells concentrates on the low-resistance region, when the battery cells swell due to an abnormal operation, such as overcharge, overdischarge, or overcurrent, of the battery pack or due to the deterioration of the battery pack caused by the charge and discharge of the battery pack for a long period of time, with the result that local deformation of the battery cells is induced upon occurrence of swelling, and therefore, a short circuit occurs, thereby securing the safety of the battery module to a desired level.

Therefore, it is an object of the present invention to provide a middle- or large-sized battery pack of a specific structure to improve safety.

Technical Solution

In accordance with one aspect of the present invention, the above and other objects can be accomplished by the provision of a middle or large-sized battery pack including (a) a battery module assembly configured in a structure in which a plurality of battery modules, each of which comprises a plurality of battery cells or unit modules connected in series to each other while being mounted in a module case, or a plurality of battery cells is electrically connected to each other while being arranged in a lateral direction such that the battery modules or the battery cells are in contact with each other, (b) a pair of side support members for covering sides of outermost battery modules or outermost battery cells of the battery module assembly, and (c) at least one top connection member for connecting the side support members at a top of the battery module assembly, wherein at least one of the side support members has a region (weak portion) exhibiting low resistance to volume expansion, the weak portion being partially formed at the at least one of the side support members for inducing local deformation of the battery modules or the battery cells upon occurrence of swelling, thereby causing a short circuit.

In the battery pack including the battery modules or the battery cells, the battery cells are expanded by the swelling of the battery cells due to an abnormal operation, such as overcharge, overdischarge, or overcurrent, of the battery pack or due to the deterioration of the battery pack caused by the charge and discharge of the battery pack for a long period time, as previously described, and the expansion of the battery cells causes the combustion and explosion of the battery pack.

For this reason, the battery pack according to the present invention is configured such that the region exhibiting low resistance to volume expansion of the battery pack is partially formed at the at least one of the side support members for covering the sides of the outermost battery modules or the outermost battery cells. Consequently, when the swelling exceeds a predetermined value, e.g., a limit value, the expansion stress concentrates on the weak portion formed at the at least one of the side support members, with the result that the weak portion is physically deformed and finally ruptured. Through such rupture of the weak portion, the electrical connection in the outermost battery module or the outermost battery cell is interrupted, and therefore, the charging and discharging operation is stopped, with the result that further swelling of the battery modules or the battery cells is restrained. Consequently, the combustion or explosion of the battery pack is prevented, whereby safety of the battery pack is greatly improved.

Also, it is possible to secure safety of the battery pack upon occurrence of swelling by the provision of only the structure of the side support member at which the weak portion is formed, without additional provision of an electrical device, such as a sensor or a relay. Furthermore, this structure uses increase of pressure to cause a short circuit instead of using an electrical signal as in the related art, and therefore, operational reliability of the battery pack according to the present invention is very high. In a state in which the swelling phenomenon does not occur, the side support members improve coupling between the battery modules, and therefore, it is possible to maintain the secure structure of the battery pack in an impact or vibration condition.

The weak portion may be formed at one of the side support members. Alternatively, the weak portion may be formed at each of the side support members. Preferably, the weak portion is formed at one of the side support members. In this case, local deformation of the battery modules or the battery cells is induced only in one direction upon occurrence of swelling, with the result that a short circuit occurs. Therefore, this case is more effective than the case in which the weak portion is formed at each of the side support members.

Preferably, the weak portion is formed at a position of the outermost battery module or the outermost battery cell corresponding to a series connection region or a region adjacent thereto so as to maximize a short circuit effect. Upon swelling of the battery cell, therefore, internal pressure of the battery cell concentrates on the series connection region of the outermost battery module or the outermost battery cell, thereby more easily causing a desired short circuit.

The weak point is not particularly restricted as long as the weak point has a structure to be easily deformed according to volume expansion due to occurrence of swelling. For example, the weak portion may include a cutout part through which a series connection region is exposed or a notch part having a notch formed at the side support member corresponding to the series connection region.

The cutout part is formed at the side support part such that a series connection region between the battery modules, a series connection region between the battery cells of each of the battery modules, a series connection region between the unit modules of each of the battery modules, or a series connection region between the battery modules is opened.

In the same manner, the notch part is formed at the side support part corresponding to a series connection region between the battery modules, a series connection region between the battery cells of each of the battery modules, a series connection region between the unit modules of each of the battery modules, or a series connection region between the battery modules is opened.

The series connection region is a region where electrode terminals are connected in series to each other. The series connection region may be electrode terminals connected to each other or connecting member, such as a wire or a bus bar, for connecting the electrode terminals.

Upon occurrence of swelling, therefore, the series connection region protrudes through the cutout part of the side support member or breaks through the notch part of the side support member. During such deformation, the series connection region is ruptured, with the result that a short circuit occurs.

It is sufficient for the series connection region exposed through the cutout part or the series connection region located at a position corresponding to the notch part to have a size to cause an intended short circuit upon occurrence of swelling.

Therefore, the size of the cutout part or the notch part of the side support member is decided based on the above-defined size. For example, the cutout part may have a size equivalent to 20 to 80% of the surface area of the side support member. However, if the size of the cutout part is too small on the basis of the surface area of the side support member, it may be difficult to induce deformation of the series connection region due to volume expansion of the battery module. On the other hand, if the size of the cutout part is too large, it may be difficult to maintain strength necessary to protect the battery module assembly from external force. More preferably, the cutout part has a size equivalent to 30 to 70% of the surface area of the side support member.

The shape of the notch part is not particularly restricted as long as the notch part can be easily ruptured due to volume expansion of the battery cells or the unit modules. For example, the notch part may be formed in a planar '[' shape. In this case, it is possible to easily form the notch part and to maximize a rupture property (rupturability) of the notch part due to volume expansion of the battery cells or the unit modules.

In this specification, the structure of the notch part is not particularly restricted so long as the notch part is easily ruptured when the battery cells or the battery modules swell. For example, the notch part may be configured in a structure in which a region of the side support member corresponding to the series connection region is partially cut in a slit shape or a narrow and long groove structure having a relatively small thickness.

Meanwhile, each of the side support members may be provided at an inside thereof with a sealing member for minimizing temperature deviation between the battery modules constituting the battery module assembly.

Preferably, the sealing member is made of, for example, a heat insulating material to further increase the cooling uniformity between the battery modules. In particular, the sealing member may be made of foam resin to minimize the total weight of the battery pack and, at the same time, to improve heat insulation.

In the above structure, the sealing member may have a cutout part or a notch part formed in a shape corresponding to the weak portion, the cutout part of the notch part being formed at a portion of the sealing member. That is, a cutout part or a notch part having a shape identical or similar to the weak portion formed at the side support member to induce local deformation of the battery module upon occurrence of swelling may be formed at a region of the sealing member corresponding to the weak portion formed at the side support member, with the result that local deformation of the electrode terminal connection region of the battery module is more easily achieved upon occurrence of swelling.

Meanwhile, the battery module assembly may be mounted on a base plate such that the battery module assembly has a more compact and stable structure, and the top connection member may be mounted at each side of the top of the battery module assembly.

In this structure, the side support members may be coupled to the top connection member at opposite sides of tops thereof while the side support members are fixed to the base plate at bottoms of thereof.

Specifically, the middle or large-sized battery pack having the above structure is configured in a structure in which the plurality of battery cells or battery modules are stacked in the longitudinal direction and/or the lateral direction to constitute the battery module assembly, and the battery module assembly is mounted on the base plate while the opposite sides of the battery module assembly are covered by the side support members, the side support members are fixed by the top connection member, and these components of the battery pack are surrounded by a pack housing. Consequently, it is possible to simplify the overall assembly process of the battery pack.

In a preferred example, the battery modules constituting the middle or large-sized battery pack according to the present invention may be fixed such that a stacked state of the battery cells or the unit modules is maintained due to even volume change of the battery cells or the unit modules during charge and discharge of the battery cells or the unit modules, expansion stress of the battery cells due to swelling may concentrate on an electrode terminal connection region between the battery cells or the unit modules, and the electrode terminal connection region may be configured in a structure having low resistance to volume expansion such that the electrode terminal connection region is ruptured, when the swelling exceeds a predetermined value, thereby causing a short circuit.

Consequently, the battery modules are configured in a structure in which the electrode terminal connection region between the battery cells or the unit modules has low resistance to the volume expansion of the battery cells or the unit modules upon swelling of the battery cells or the unit modules. When the swelling exceeds a predetermined value, i.e., a limit value, therefore, expansion stress concentrates on the electrode terminal connection region, with the result that the electrode terminal connection region is physically deformed and ruptured.

In this structure, the battery cells or the unit modules may be surrounded by a case, and the electrode terminal connection region configured to be ruptured upon excessive swelling of the battery cells may be opened or have a notch formed at the case.

That is, the unit modules are manufactured such that a portion of the electrode terminal connection region has a structure of low resistance to expansion stress, such as an open structure or a structure having a notch, whereby excessive expansion stress caused upon swelling of the battery cells concentrates on the open region or the notch region of the electrode terminal connection region.

As a concrete example of the above structure, each of the unit modules may include battery cells configured such that electrode terminals of the battery cells are connected in series to each other and a connection part between the electrode terminals is bent such that the battery cells are stacked and a pair of high-strength cell covers configured to be coupled to each other such that the cell covers cover outer surfaces of the battery cells excluding the electrode terminals, and one of the cell covers may be provided at a region thereof adjacent to the electrode terminal connection region with a cutout part or a notch part formed in a shape to induce local deformation of the battery cells during swelling.

For example, the battery cells may be covered by high-strength cell covers, made of synthetic resin or metal, to constitute a unit module. The high-strength cell covers serve to protect the battery cells, which exhibit low mechanical strength and, at the same time, to restrain the change in repetitive expansion and contraction of the battery cells during the charge and discharge of the battery cells, thereby preventing the breakage of sealing regions of the respective battery cells. A desired-shaped cutout part or a desired-shaped notch part is formed at a portion of one of the cell covers adjacent to the electrode terminal connection region such that an expansion stress caused by the swelling of the battery cells concentrates on the cutout part or the notch part of the cell cover.

For example, each of the battery modules may include a plurality of unit modules, each of which includes plate-shaped battery cells each having electrode terminals formed at the front and rear sides of a battery case. In this structure, the unit modules may be mounted in the battery case in a structure in which the unit modules are erected in the lateral direction while being spaced a predetermined distance from each other such that a coolant can flow to cool the unit modules.

In the above structure, the cutout part or the notch part may be formed at a corresponding one of the cell covers of each of the outermost unit modules. Consequently, expansion stress of the battery cells due to the abnormal operation of the battery cells concentrates on the cutout part or the notch part formed at the cell cover of the outermost unit module, with the result that the electrode terminal connection region between the battery cells of the outermost unit module is ruptured, whereby the electrical connection for charging and discharging is easily interrupted.

The size of the cutout part or the notch part may be changed depending upon the rupture setting conditions of the electrode terminal connection region. Preferably, the size of the cutout part or the notch part is set such that the electrode terminal connection region is ruptured when the swelling of the battery cells brings about the increases in volume of the battery cells equivalent to 1.5 to 5 times the thickness of each of the battery cells. Such a setting range may be changed based on the safety test standard of a desired battery module. However, if the size of the of the cutout part or the notch part is too large, the mechanical strength of the battery cells achieved by the cell covers may decrease, and the expansion of the battery cells may not be properly restrained in a normal operation condition. Therefore, it is necessary to set the size of the cutout part or the notch part within an appropriate range in consideration of the above-mentioned requirements.

The shape of the notch part is not particularly restricted as long as the notch part is formed at a region of a corresponding one of the cell covers adjacent to the electrode terminal connection region. For example, the notch part may be formed in a straight shape.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
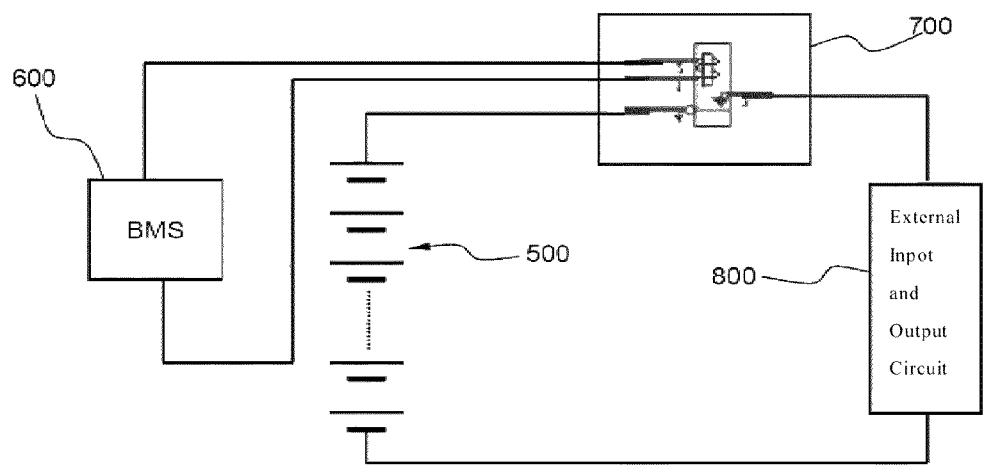
FIG. 1 is a circuit diagram typically illustrating a conventional middle or large-sized battery pack.
Figure 2:
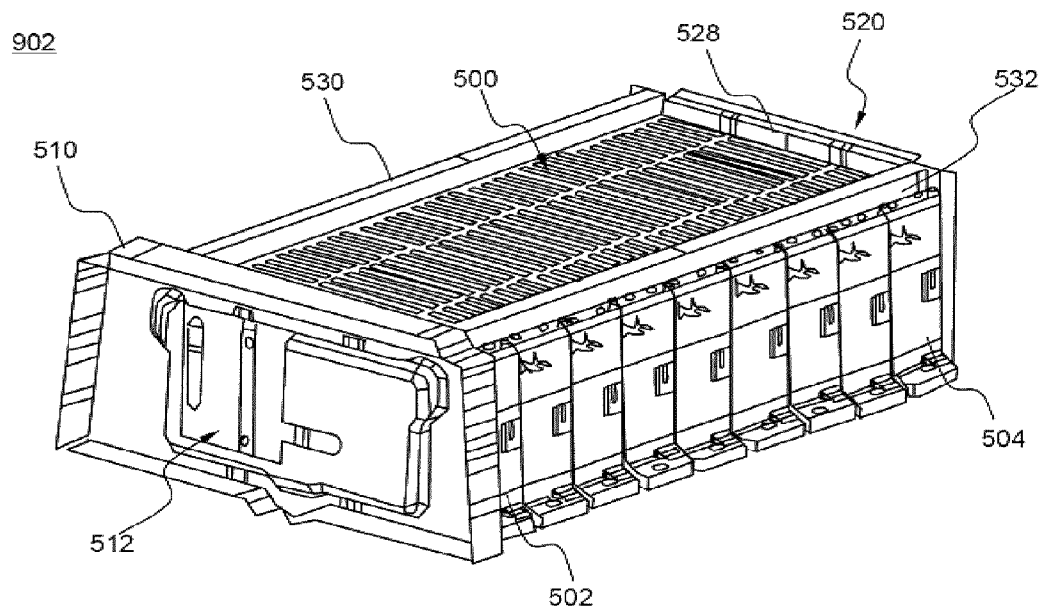
FIG. 2 is a perspective view illustrating a middle or large-sized battery pack according to an embodiment of the present invention.
Figure 3:
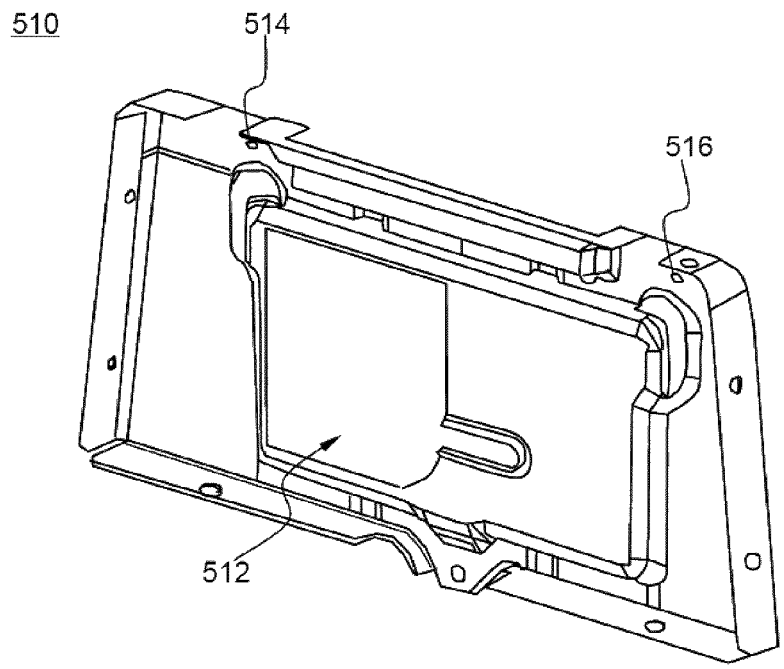
FIGS. 3 and 4 are perspective views illustrating side support members of the middle or large-sized battery pack of FIG. 2.
Figure 4:
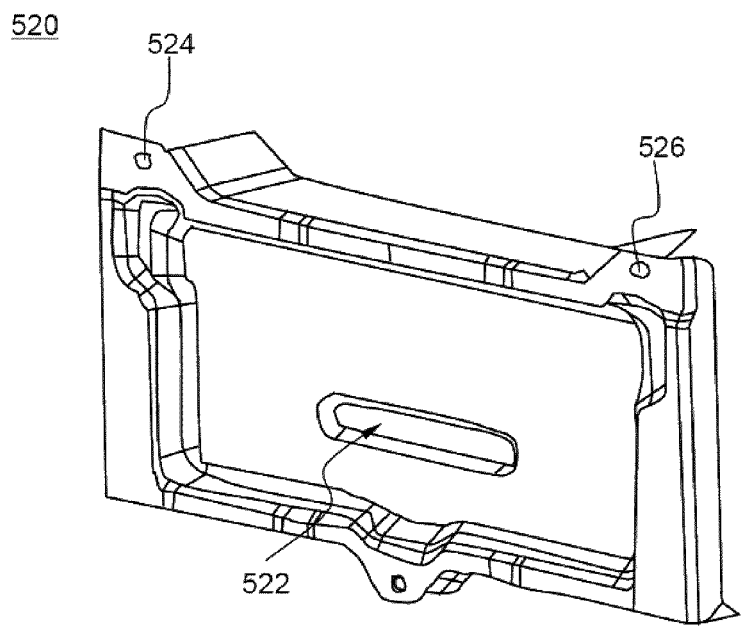

FIG. 2 is a perspective view typically illustrating a middle or large-sized battery pack according to an embodiment of the present invention, and FIGS. 3 and 4 are perspective views typically illustrating side support members of the middle or large-sized battery pack of FIG. 2.

Referring to these drawings, a middle or large-sized battery pack 902 includes a battery module assembly 500 including nine battery modules 502 and 504 electrically connected to each other while being arranged in the lateral direction such that the battery modules 502 and 504 are in contact with each other, a pair of side support members 510 and 520 for covering sides of the outermost battery modules 502 and 504, respectively, and a pair of top connection members 530 and 532 connected to the side support members 510 and 520 at the top of the battery module assembly 500.

A cutout part 512, through which the outermost battery module 502 is partially exposed such that local deformation of the outermost battery module 502 is easily achieved, is formed at a portion of the side support member 510, which is disposed at the left side of the battery module assembly 500. The cutout part 512 has a size equivalent to approximately 30% of the surface area of the side support member 510. The cutout part 512 is located at a position corresponding to a series connection region of the outermost battery module 502 and a position adjacent thereto.

Also, sealing members 528, which are made of a heat insulation material to secure cooling uniformity between the battery modules 502 and 504, are mounted to the insides of the respective side support members 510 and 520. Coupling holes 514, 516, 524, and 526 for connection between the side support members 510 and 520 and the top connection members 530 and 532 are formed at opposite sides of the tops of the respective side support members 510 and 520.

A slit 522 for positioning the sealing member 528 is formed at the side support member 520, which is disposed at the right side of the battery module assembly 500. However, the side support member 520 exhibits low strength, and therefore, the side support member 520 may be easily ruptured upon swelling of the battery module assembly 500. According to circumstances, a cutout part or a notch part corresponding to the cutout part 512 of the side support member 510 may be formed at the sealing member 528 so as to achieve easier rupture of the side support member 520.

Figure 5:
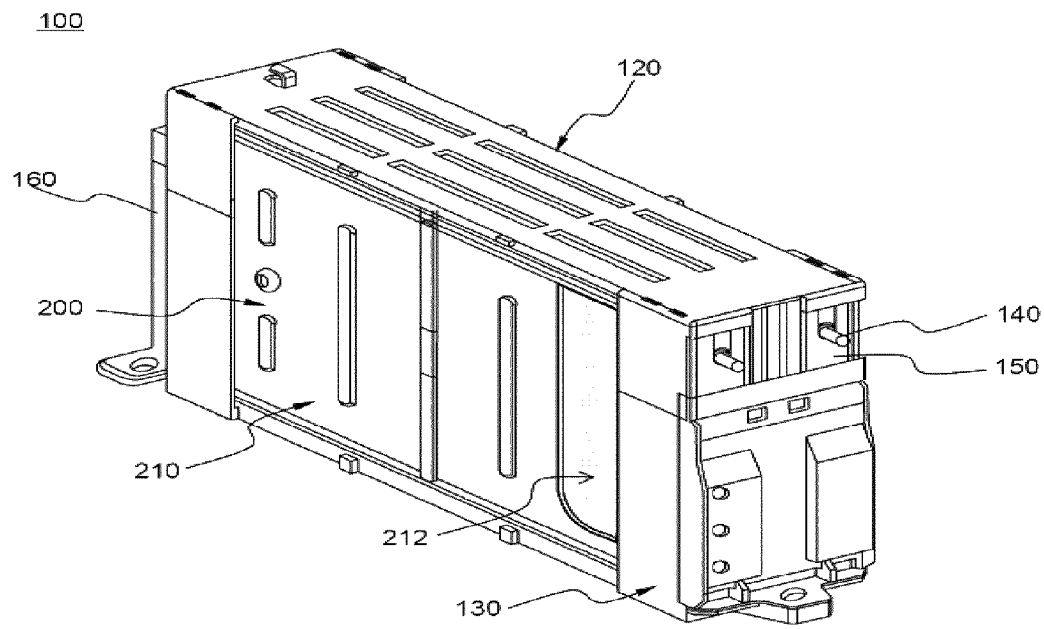
FIGS. 5 and 6 are perspective views illustrating a battery module used in the middle or large-sized battery pack of FIG. 2.
Figure 6:
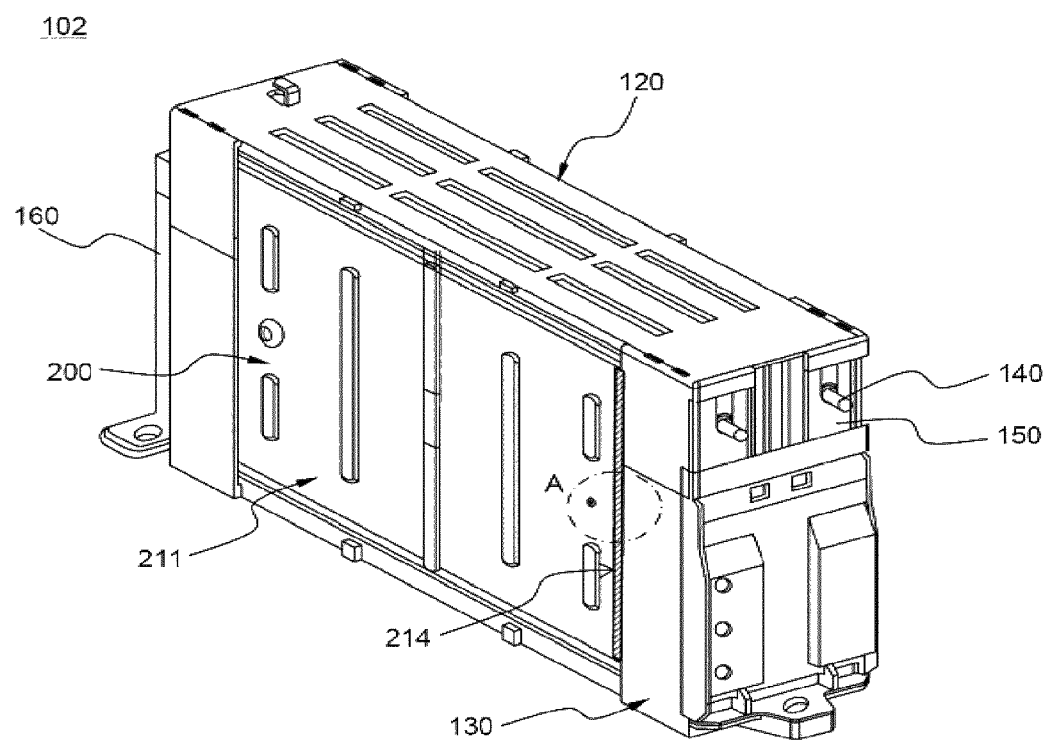

FIGS. 5 and 6 are perspective views typically illustrating a battery module used in the middle or large-sized battery pack of FIG. 2.

Referring to FIG. 5, a battery module 100 is configured in a structure in which a unit module stack 200 is erected in the lateral direction while the unit module stack 200 is mounted between an upper case and a lower case 130 which are assembled to each other. Input and output terminals 140 are formed at the front of the upper case 120. Bus bars 150 for electrical connection with the input and output terminals 140 are formed at the front of the lower case 130. A connector for connection of a voltage and temperature sensor is mounted at the rear of the lower case 130.

A cutout part 212 is formed at an outermost unit module 210 of the unit module stack 200. When a battery cell is swelled by gas generated form the battery cell due to a short circuit or overcharge of the battery cell, therefore, local deformation of the battery cell may be induced by the cutout part 212.

A battery module 102 of FIG. 6 is identical to the battery module 100 of FIG. 5 except that a notch part 214 is formed at a region of a corresponding cell cover of an outermost unit module 211 adjacent to an electrode terminal connection region in a straight shape, and therefore, a detailed description thereof will not be given.

Figure 7:
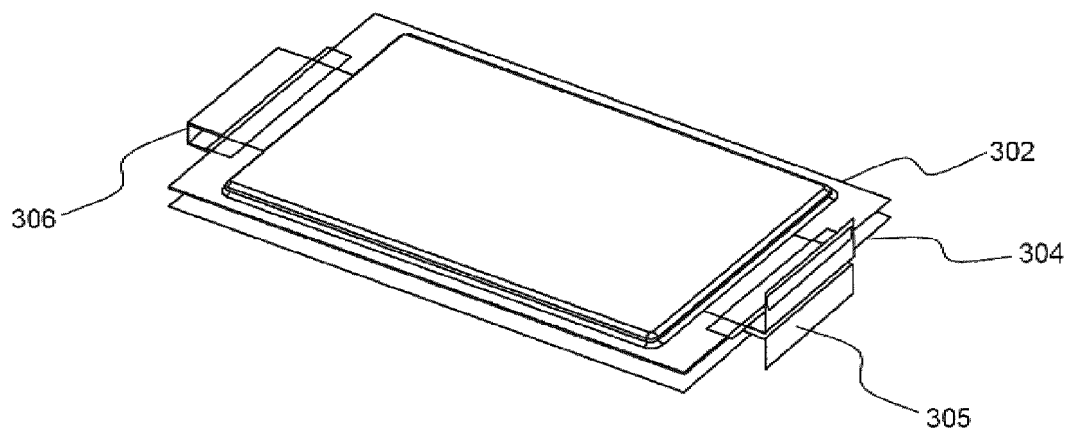
FIGS. 7 and 8 are perspective views respectively illustrating a pair of battery cells and cell covers constituting a unit module of the battery module of FIG. 5.
Figure 8:
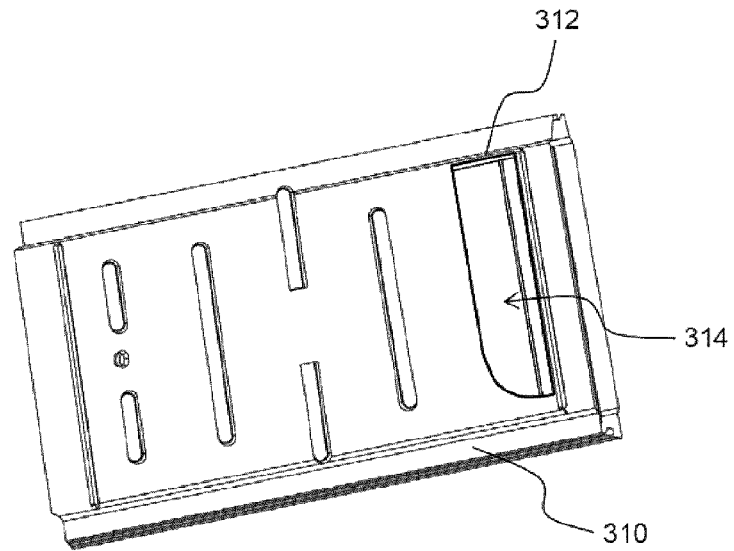

FIGS. 7 and 8 are perspective views respectively illustrating a pair of battery cells and cell covers constituting a unit module of the battery module of FIG. 5.

Referring to these drawings, a unit module (not shown) is configured in a structure in which two battery cells 302 and 304 connected in series to each other are covered by high-strength cell covers 310 while electrode terminals 305 and 306 of the battery cells 302 and 304 are bent. The cell covers 310 are coupled to each other so as to cover outer surfaces of the battery cells 302 and 304 excluding the electrode terminals 305 and 306. A cutout part 312 is formed at a region of one of the cell covers 310 adjacent to an electrode terminal connection region 314. Upon swelling of the battery cells 302 and 304, therefore, the electrode terminal connection region 314 between the battery cells 302 and 304 extrudes and deformed through the cutout part 312.

Figure 9:
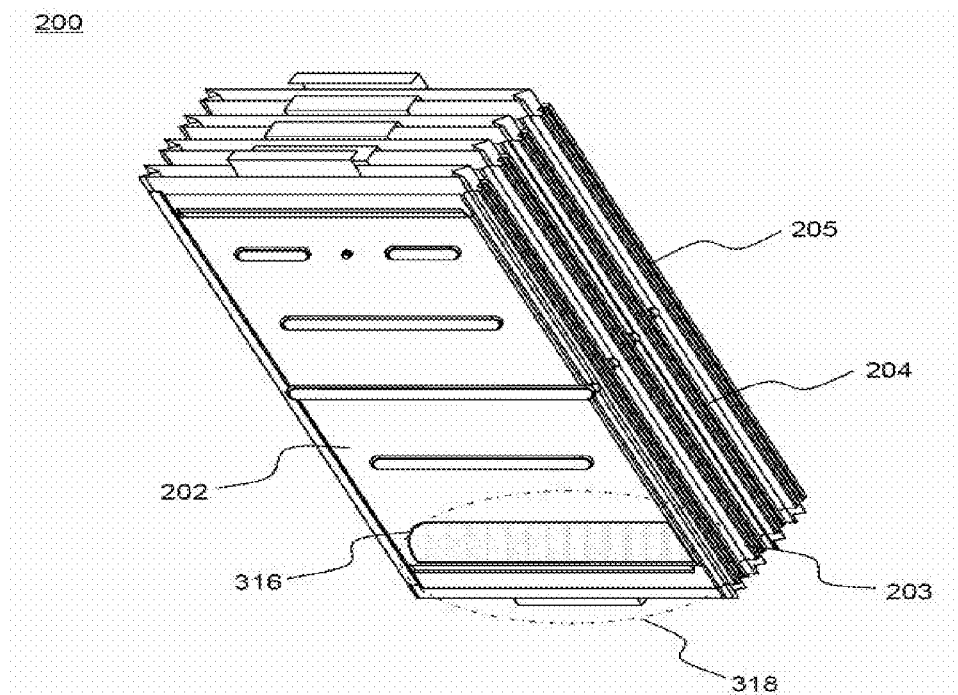
FIG. 9 is a perspective view illustrating a unit module stack.

FIG. 9 is a perspective view typically illustrating a unit module stack.

Referring to FIG. 9, a unit module stack 200 is configured in a structure in which four unit modules 202, 203, 204, and 205, each of which includes battery cells covered by cell covers, are connected in series to each other while being stacked in zigzags. A cutout part 315 of a predetermined shape is formed at a region 318 of a corresponding cell cover for covering an outermost one, i.e., the unit module 202, of the four unit modules 202, 203, 204, and 205 adjacent to an electrode terminal connection region.

Figure 10:
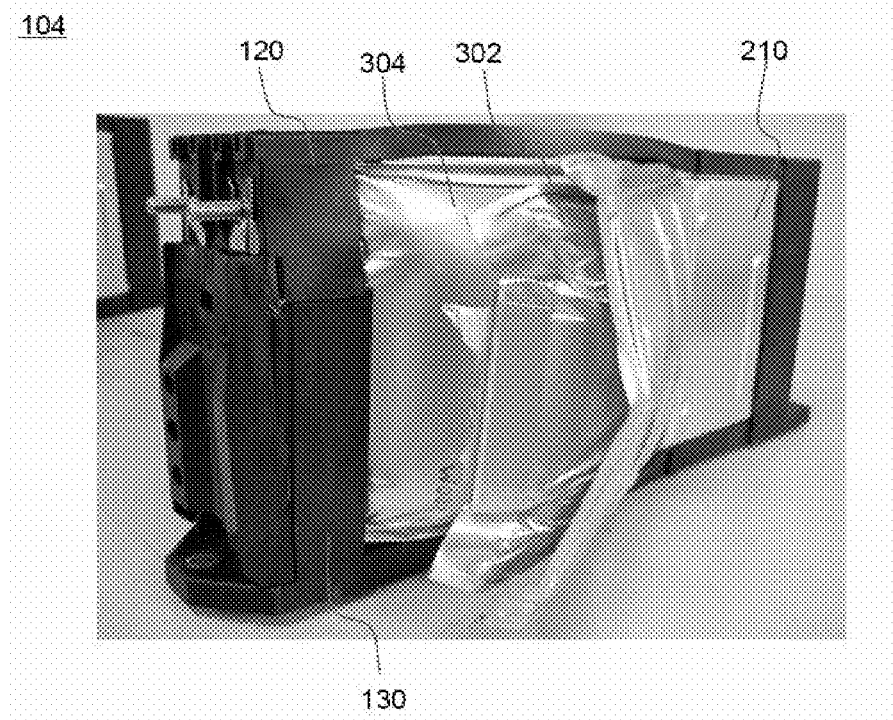
FIG. 10 is a picture of a battery module experiment illustrating an electrode terminal ruptured due to swelling.

FIG. 10 is a picture of a battery module experiment illustrating an electrode terminal ruptured by swelling.

The inventors manufactured a battery module having the structure of FIG. 6 and carried out an overcharge test upon the manufactured battery module to confirm effects of the present invention. The result is shown in FIG. 10.

Referring to FIG. 10 together with FIG. 6, the battery cells 302 and 304 were swelled when the battery module 104 was overcharged. Expansion of the battery cells 302 and 304 due to such swelling concentrated on the notch part 214 partially formed at one of the cell covers of the outermost unit module 211. As a result, expansion of the battery cells 302 and 304 at the notch part 214 was equivalent to approximately three times the thickness of a normal battery cell. Due to such expansion, the electrode terminal connection region between the battery cells 302 and 304 was ruptured, with the result that the series connection between the battery cells 302 and 304 was destroyed, and therefore, a short circuit occurred. Consequently, further charging did not occur.

For reference, the battery module 104 of FIG. 10 was manufactured in the same structure as the battery module 102 of FIG. 6 except that the cell cover structure of the outermost unit module 211 was applied to the cell covers of the outermost unit module disposed at the right side of the battery module.

Figure 11:
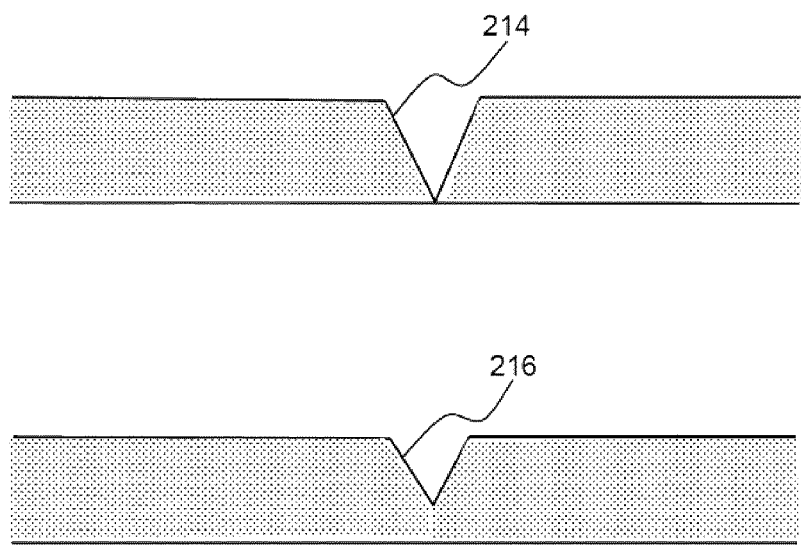
FIG. 11 is a vertical sectional view typically illustrating a region A of the battery module of FIG. 6.

FIG. 11 is a vertical sectional view typically illustrating a region A of the battery module of FIG. 6.

Referring to FIG. 11 together with FIG. 6, the notch part may be configured in a structure 124 in which a portion of the outermost unit module 211 is partially cut in a slit shape or a narrow and long groove structure 216 having a relatively small thickness.

INDUSTRIAL APPLICABILITY

As is apparent from the above description, the battery pack according to the present invention is configured such that a region having low resistance to volume expansion is formed at one of the side support members. Consequently, the region having low resistance to volume expansion is ruptured when the battery cell or the unit module expands due to abnormal operation, such as overcharge, overdischarge, and overcurrent, of the battery module or due to deterioration of the battery module caused by charge and discharge of the battery module for a long period of time, thereby greatly improving safety of the battery module.

Also, the middle or large-sized battery pack according to the present invention is configured such that electrical connection and disconnection between the battery modules and the external input and output circuit are performed by the power switch unit irrespective of the BMS. Consequently, it is possible to secure safety of the battery pack even when the BMS malfunctions or does not operate, thereby improving reliability of the battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A middle or large-sized battery pack comprising:
(a) a battery module assembly having a plurality of battery modules, each battery module comprising a plurality of battery cells or unit modules, wherein the battery modules are fixed such that a stacked state of the battery cells or the unit modules is maintained due to even volume change of the battery cells or the unit modules during charge and discharge of the battery cells or the unit modules, expansion stress of the battery cells due to swelling concentrates on an electrode terminal connection region between the battery cells or the unit modules, and the electrode terminal connection region is configured in a structure having low resistance to volume expansion such that the electrode terminal connection region is ruptured, when the swelling exceeds a predetermined value, thereby causing a short circuit, each of which comprises a plurality of unit modules connected in series to each other while being mounted in a module case, or a plurality of battery cells is electrically connected to each other while being arranged in a lateral direction such that the unit modules or the battery cells are in contact with each other;

(b) a pair of side support members for covering sides of outermost battery modules; and (c) at least one top connection member for connecting the side support members to improve coupling strength between the battery modules at a top of the battery module assembly, wherein at least one of the side support members has a weak portion exhibiting low resistance to volume expansion, the weak portion being partially formed at the at least one of the side support members for inducing local physical deformation of the battery modules or the battery cells upon occurrence of swelling, thereby causing a short circuit, wherein the weak portion is formed at a position of the outermost battery module corresponding to a series connection region or a region adjacent thereto, wherein the weak portion comprises a cutout part through which the series connection region is exposed or a notch part having a notch formed at the side support member corresponding to the series connection region, and wherein the series connection region protrudes outside of the side support member through the weak portion.

2. The middle or large-sized battery pack according to claim 1, wherein the weak portion is formed at one of the side support members.

3. The middle or large-sized battery pack according to claim 1, wherein the cutout part has a size equivalent to 20 to 80% of a surface area of the side support member.

4. The middle or large-sized battery pack according to claim 1, wherein the notch part is formed in a planar '[' shape.

5. The middle or large-sized battery pack according to claim 1, wherein each of the side support members is provided at an inside thereof with a sealing member.

6. The middle or large-sized battery pack according to claim 5, wherein the sealing member has a cutout part or a notch part formed in a shape corresponding to the weak portion, the cutout part or the notch part being formed at a portion of the sealing member.

7. The middle or large-sized battery pack according to claim 1, wherein the battery module assembly is mounted on a base plate, and the top connection member is mounted at each side of the top of the battery module assembly.

8. The middle or large-sized battery pack according to claim 7, wherein the side support members are coupled to the top connection member at opposite sides of tops thereof while the side support members are fixed to the base plate at bottoms of thereof.

9. The middle or large-sized battery pack according to claim 1, wherein the battery cells or the unit modules are surrounded by a high-strength case, and the electrode terminal connection region configured to be ruptured upon excessive swelling of the battery cells is partially opened or has a notch.

10. The middle or large-sized battery pack according to claim 9, wherein each of the unit modules comprises:

battery cells configured such that electrode terminals of the battery cells are connected in series to each other, and a connection part between the electrode terminals is bent such that the battery cells are stacked; and a pair of high-strength cell covers configured to be coupled to each other such that the cell covers cover outer surfaces of the battery cells excluding the electrode terminals, and wherein one of the cell covers is provided at a region thereof adjacent to the electrode terminal connection region with a cutout part or a notch part formed in a shape to induce local deformation of the battery cells during swelling.

11. The middle or large-sized battery pack according to claim 10, wherein the cutout part or the notch part is formed at a corresponding one of the cell covers outermost unit modules.

12. The middle or large-sized battery pack according to claim 10, wherein the cutout part or the notch part has a size set such that the electrode terminal connection region is ruptured when volume expansion corresponding to 1.5 to 5 times the thickness of each of the battery cells is caused by swelling of the battery cells.

13. The middle or large-sized battery pack according to claim 10, wherein the notch part is formed at a region of a corresponding one of the cell covers adjacent to the electrode terminal connection region in a straight shape.

14. The middle or large-sized battery pack according to claim 1, wherein the at least one top connection member has a first end connected to one of the side support members and a second end connected to another side support member.

15. The middle or large-sized battery pack according to claim 1, wherein the weak portion creates an opening in the side support allowing the series connection region to extend through the side support member upon swelling of an outermost battery module.

16. The middle or large-sized battery pack according to claim 1, wherein expansion of the battery cells at the electrode terminal connection region due to the swelling is equivalent to three times the thickness of a normal battery cell.

* * * * *